(No Model.)
T. BLACKBURN.
WARP MEASURING MACHINE.
No. 515,139.      Patented Feb. 20, 1894.
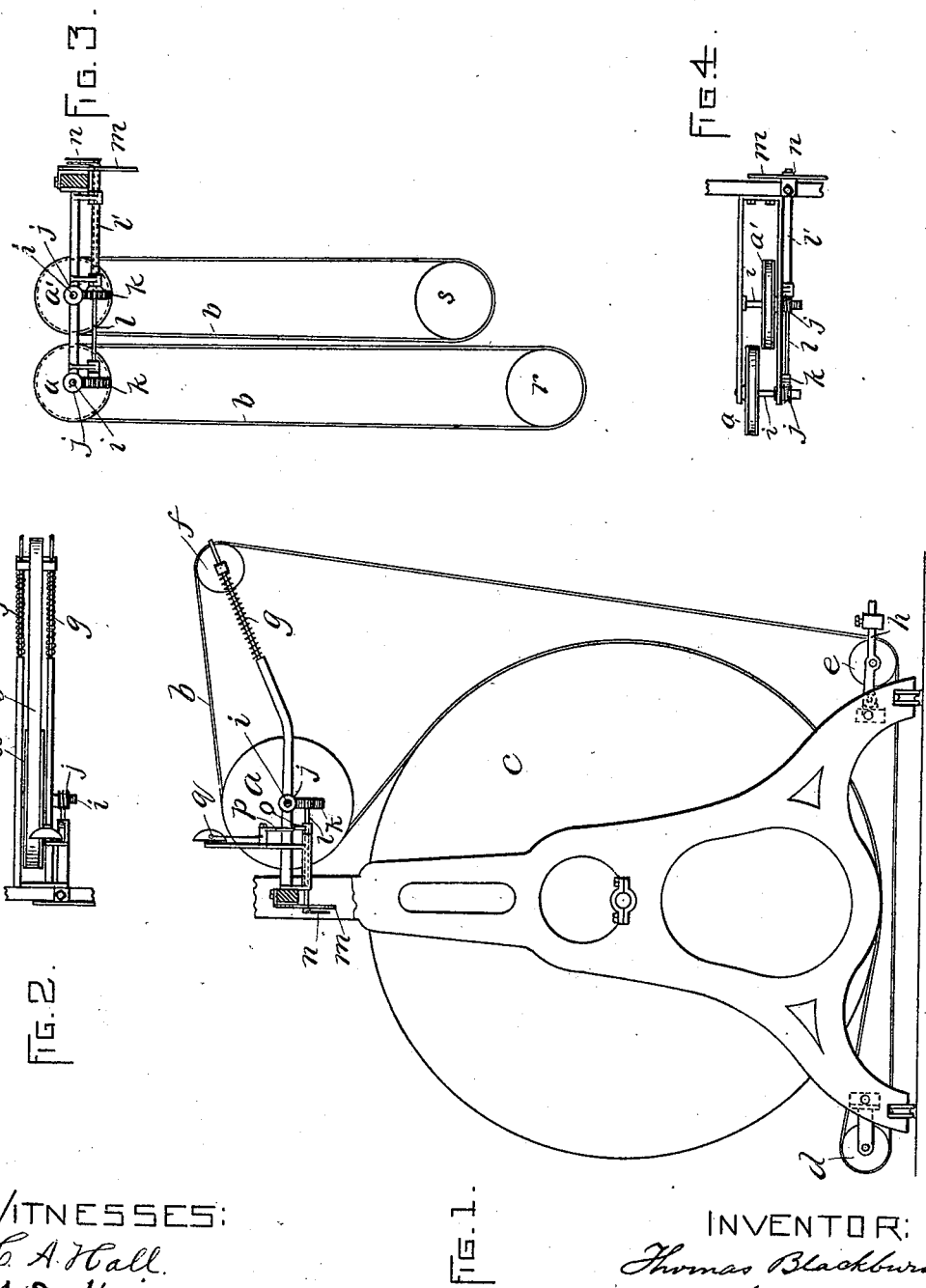
WITNESSES:
H. A. Hall.
A. D. Harrison.
INVENTOR:
Thomas Blackburn
by
Wright, Brown & Crossley.
Attys.

UNITED STATES PATENT OFFICE.

THOMAS BLACKBURN, OF DOVER, NEW HAMPSHIRE, ASSIGNOR OF ONE-HALF TO JOHN LANCASTER, OF SAME PLACE.

WARP-MEASURING MACHINE.

SPECIFICATION forming part of Letters Patent No. 515,139, dated February 20, 1894.

Application filed June 6, 1893. Serial No. 476,712. (No model.)

*To all whom it may concern:*

Be it known that I, THOMAS BLACKBURN, of Dover, in the county of Strafford and State of New Hampshire, have invented certain new and useful Improvements in Means for Measuring Warps, of which the following is a specification.

This invention has relation to means for measuring warps or yarns in the course of their preparation for, or use in, the process of weaving.

It is the object of the invention to provide improvements in devices of the kind mentioned whereby it may be ascertained with absolute exactness the length of warp or yarn that may have been wound upon or unwound from a reel or beam.

Heretofore it has been usual, particularly in warp-dressing frames, in the measurement of warps or yarns under treatment, or in course of preparation for the loom, to provide means for indicating the number of revolutions of the reel or other means upon which the warps or yarns were wound, but as the diameter of the reel was increased with each successive layer wound thereon exactness of measurement was impossible. In the use of warp-dressing frames, with this system of measurement, each succeeding cut wound upon the reel is longer than the first; and in all cases where measurement is calculated upon the revolutions of the reel or beam upon which the material is wound or from which it is drawn, the length of the said material varies in accordance with the variation in the diameter of the said reel or beam. By these improvements the objections mentioned are overcome, and absolute accuracy of measurement is obtained regardless of the diameter of the reel or beam.

To the foregoing ends the invention consists in constructing and arranging a belt so that it may be run by contact with the warps or yarns under treatment, which belt may be made to drive a pulley or equivalent contrivance connected through the medium of suitable gearing with an indicator, so that as the said pulley is driven in exact accord with the length or extent of warps or yarns moved, and as the indicator is operated exactly in proportion to the movement of the pulley or other like device, the measurement exhibited by the indicator will be infallibly correct, all as I will now proceed to describe in detail, and point out in the appended claim.

Reference is to be had to the annexed drawings, and to the letters marked thereon, forming a part of this specification, the same letters designating the same parts or features as the case may be, wherever they occur.

In the drawings—Figure 1 is a sectional end view of a warp or dresser reel equipped with the invention. Fig. 2 is a top vertical view of the principal parts of the improvements. Fig. 3 is a diagrammatic side view of a form of the invention adapted for use upon a double warp-beam loom. Fig. 4 is a plan view of the principal parts of Fig. 3.

In carrying out the invention (having reference to Figs. 1 and 2), there is provided a pulley $a$, around which passes a belt $b$, the advancing or receding portion of which passes in contact with the warps on the reel $c$. From the point of contact with the warps the belt $b$ passes around guide pulleys $d\ e\ f$. One of the guide pulleys, say for example, the guide-pulley $f$, is constructed as a belt-tightening pulley—that is to say, its gudgeons or journals are supported in movable bearings, which are pressed away by springs $g$, so as to press the pulley $f$ against the belt $b$ and keep the latter taut. The bearing of the belt $b$ on the warps of the reel will be sufficiently extensive to create friction enough to drive it with certainty, and the tension on the said belt will be governed to the same end, so that instead of making the guide pulley $f$ a belt-tightener by means of springs, the pulleys $d$ or $e$, or both $d$ and $e$ may be made belt-tighteners by supporting the same on the ends of swinging weighted arms, as indicated by dotted lines $h$ in Fig. 1.

On the journal shaft $i$ to which the pulley $a$ is secured there is a worm $j$ which meshes with and drives a worm gear $k$ fast on a pointed shaft $l$ to the outer end of which, extending through a dial $m$ there is a pointer $n$ to indicate on the dial the extent to which the pointer shaft has been turned through the medium of the means connecting it with the pulley $a$ driven by the belt $b$. The pointer shaft $l$ may be provided with a radially extended finger $o$, adapted at each revolution of the pointer shaft to engage the spring arm $p$ of a bell hammer or striker $q$ and strike or sound the bell. With this construction and arrangement of parts it will be seen that the belt $b$ will be driven in exact accordance with the length or extent of movement of the warp, irrespective of the diameter of the reel and that the pointer will be operated correspondingly, so that if the dial should be spaced or scale-marked into yards the operator can see at all times the precise number of yards of warp reeled. If the pointer operating means should be so timed that one revolution of the pointer shaft would complete a cut the sounding of the bell $q$ will indicate to the operator without looking at the dial, that a complete cut has been reeled. In this way uncertainty in lengths of warp is avoided, and waste and loss of time is prevented resulting from dressing short warps left on one or more beams, tying on to those ends that are short, or cutting out the remaining short warps.

The adaptation of the invention to looms in which double, or a plurality, of warp beams are used, is shown in Figs. 3 and 4. The general organization and mode of operation in this case are the same as has already been described. It may be convenient in most cases under this modification to pass a belt $b$ around the warps of each beam $r$ $s$, the belt from the former beam passing over the pulley $a$, and operating a worm, worm gear, pointer-shaft, and pointer, precisely as has already been described; and the belt from the beam $s$ passing over a pulley $a'$, on the journal shaft of which there is a worm $j$ meshing with a worm gear $k$ fast on a hollow pointer shaft $l'$, through which the pointed shaft $l$ passes, there being a pointer on the end of the hollow shaft also co-operating with the dial $m$. In this case the pointers will be operated in unison if the warps are moved in unison, and if the warps are not so moved, the fact will be instantly indicated.

Other changes may be made in the form and arrangement of parts without departing from the nature or spirit of the invention.

Having thus explained the nature of the invention and described a way of constructing and using the same, though without attempting to set forth all of the forms in which it may be made or all of the modes of its use, it is declared that what is claimed is—

A means for measuring warps or yarns wound upon or unwound from a beam comprising in its construction a belt, guide pulleys for guiding the belt in contact with the warps, a pulley over which the said belt runs, the shaft of the said pulley, a worm on said shaft, a pointer shaft, a worm wheel on the pointer shaft engaged and operated by the said worm, a dial and a pointer on the pointer shaft operating over the said dial, as set forth.

In testimony whereof I have signed my name to this specification, in the presence of two subscribing witnesses, this 31st day of May, A. D. 1893.

THOMAS BLACKBURN.

Witnesses:
NICHOLAS E. SMITH,
WILLIAM JENKINSON.